(12) United States Patent
Fujioka et al.

(10) Patent No.: US 6,629,904 B2
(45) Date of Patent: Oct. 7, 2003

(54) DETAILED DESCRIPTION OF THE INVENTION

(75) Inventors: Hiroshi Fujioka, Wako (JP); Kouhei Ohsono, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/926,605

(22) PCT Filed: Mar. 21, 2001

(86) PCT No.: PCT/JP01/02227
§ 371 (c)(1),
(2), (4) Date: Nov. 26, 2001

(87) PCT Pub. No.: WO01/75331
PCT Pub. Date: Oct. 11, 2001

(65) Prior Publication Data
US 2002/0137586 A1 Sep. 26, 2002

(30) Foreign Application Priority Data
Mar. 30, 2000 (JP) .......................... 2000-93342

(51) Int. Cl.[7] ................ F16G 1/22; F16G 5/16
(52) U.S. Cl. ........................ 474/242; 474/201
(58) Field of Search ................ 474/242, 201, 474/272, 244, 237, 265, 245

(56) References Cited

U.S. PATENT DOCUMENTS 4,332,575 A * 6/1982 Hendriks .................... 474/201
4,619,634 A * 10/1986 Nakawaki ................... 474/201
5,169,369 A * 12/1992 Masuda et al. .............. 474/242
6,217,472 B1 * 4/2001 Fujioka et al. .............. 474/242

FOREIGN PATENT DOCUMENTS

| JP | 58-1846 | | 1/1983 | |
|----|---------|--|--------|--|
| JP | 59-180037 | | 12/1984 | |
| JP | 61-160645 A | * | 7/1986 | ................ 474/242 |
| JP | 2-22254 | | 5/1990 | |
| JP | 03-28546 A | * | 2/1991 | ................ 474/201 |

* cited by examiner

*Primary Examiner*—Marcus Charles
(74) *Attorney, Agent, or Firm*—Armstrong, Westerman & Hattori, LLP

(57) ABSTRACT

An endless metal belt with reduced friction and increased durability comprises a pair of layered ring structures (31) each formed by superposing a plurality of thin metal rings in layers so as to be slidable relative to each other, and a plurality of metal blocks (32) arranged along the length of the pair of layered ring structures (31) and supported on the pair of layered ring structures (31) so as to be slidable relative to the pair of layered ring structures (31), and the inner circumferences of the thin metal rings excluding the innermost thin metal ring (R1) are provided with oil retaining grooves (34), and the inner circumference in sliding contact with saddle surfaces ($32_4$) of the metal blocks (32) of the innermost thin metal ring (R1) is a flat, smooth surface (35) not provided with any oil retaining grooves and having a small surface roughness.

7 Claims, 9 Drawing Sheets

DETAILED DESCRIPTION OF THE INVENTION

TECHNICAL FIELD

The present invention relates to an endless metal belt for a continuously variable transmission for a vehicle, having a layered ring structure formed by superposing a plurality of thin metal rings in layers so as to be slidable relative to each other and a plurality of metal blocks supported on the layered ring structure so as to be slidable relative to the layered ring structure, and extended between a pair of pulleys for torque transmission.

BACKGROUND ART

A drive belt, i.e., an endless metal belt of this kind, disclosed in, for example, JP-B-Hei 2-22254 has a carrier, which corresponds to the layered ring structure, formed by superposing a plurality of endless metal bands, which correspond to the thin metal rings, and a plurality of cross members, which corresponds to the metal blocks, combined with the carrier so as to be slidable relative to the carrier. The inner circumference of each metal band is provided with intersecting grooves to reduce friction between the adjacent metal bands that slide relative to each other in order to improve the torque transmission efficiency of the drive belt.

When the carrier is tensioned, a greater pressure is produced in the inner endless metal band, and a pressure applied to the cross members by the innermost endless metal band is the greatest. When the innermost endless metal band and the cross members slide relative to each other in a state where the maximum pressure is applied to the cross members by the innermost endless metal band, friction is more liable to be produced between the innermost endless metal band and the cross members than between the adjacent endless metal bands. Since the endless metal bands are thin and a high tension is induced in the endless metal bands, the abrasion of the inner circumference of the innermost endless metal band is one of the factors that dominate the durability of the carrier, and hence that of the drive belt.

The innermost endless metal band of the carrier of the aforesaid prior art drive belt is provided in its inner circumference with the intersecting grooves, and the inner circumference of the innermost endless metal band is in sliding contact with the upper surfaces of the cross members. It was found that the inner circumference of the innermost endless metal band is abraded rapidly when the inner circumference of the innermost endless metal band that applies the maximum pressure to the cross members is provided with the grooves as mentioned above.

FIG. 5 is a graph showing data obtained through experiments using an endless metal belt type continuously variable transmission driven by an internal combustion engine. In the experiments, input torque was 161.8 Nm, engine speed was 6000 rpm and speed change ratio was 0.61 (overdrive speed). FIG. 5 shows the change with time of the maximum peak-to-valley height $R_{max}$, i.e., an index of the surface roughness, of the circumference of the endless metal band. FIG. 6 is a graph obtained on the basis of the data shown in FIG. 5, showing the relation between the surface roughness ($R_{max}$) of the of the endless metal band and the surface roughness change rate ($R_{max}$ change rate). It is obvious from those graphs that the inner circumference of the endless metal band provided with the grooves is abraded rapidly because the depth of the grooves formed in the same inner circumference is in the range of 2.5 to 5.0 μm. It is known from those graphs that the progress of abrasion becomes very slow when the surface roughness $R_{max}$ is 2.0 μm or below.

When the endless metal band is subjected to heat treatment or a surface hardening process, such as a nitriding process, after forming the grooves in the circumference of the endless metal band, a hard skin $L_H$ (FIG. 8) and an internally stressed layer having a residual stress are formed in an inner circumferential part provided with the grooves of the endless metal band.

FIG. 7 is a graph shows the variation of the Vickers hardness HV of the endless metal band with distance from the inner circumference in which the hard skin $L_H$ is formed. It is known from this graph that the rate of abrasion of the endless metal band increases after the hard skin $L_H$ has been removed by abrasion and a part having a low hardness has been exposed. The inner circumference of the endless metal band provided with the intersecting grooves (meshy grooves) has both hard parts and soft parts as shown in FIG. 8 when the inner circumference of the endless metal band is abraded, and the inner circumference having such an irregular hardness is abraded more rapidly than the inner circumference having the uniform hardness. In FIG. 8, the width C1 of ridges defining the grooves and the depth C2 of the grooves are exaggerated and the proportion between C1 and C2 does not represents an actual proportion. In FIG. 8, two-dot chain lines indicate the inner circumference before abrasion.

FIG. 9 is a graph showing variation of the residual stress in the internally stressed layer with distance from the inner circumference of the endless metal band. It is known from this graph that the fatigue strength of the inner circumference of the innermost endless metal band that undergoes repeated load decreases, the rate of abrasion increases because a part having a low internal stress is exposed when the inner circumference is abraded progressively. As the inner circumference provided with the intersecting grooves of the endless metal band of the drive belt is abraded progressively, both parts having a high residual stress and those having a low residual stress appear in the inner circumference. Consequently, the inner circumference is irregularly stressed and the fatigue strength thereof decreases.

Thus the innermost endless metal band of the prior art drive belt is abraded markedly, and the carrier, hence the drive belt, needs improvements relating with durability.

The present invention has been made in view of such problems and it is therefore an object of the present invention to provide a durable layered ring structure for an endless metal belt.

DISCLOSURE OF THE INVENTION

According to the present invention, an endless metal belt to be extended between a pair of pulleys to transmit torque from one of the pulleys to the other comprises: a pair of layered ring structures each formed by superposing a plurality of thin metal rings in layers so as to be slidable relative to each other; and a plurality of metal blocks arranged along the length of the pair of layered ring structures and supported on the pair of layered ring structures so as to be slidable relative to the layered ring structures; wherein at least one of the circumferences in sliding contact with each other of adjacent thin metal rings is provided with oil retaining grooves, and the inner circumference in sliding contact with the saddle surfaces of the metal blocks of the innermost thin metal ring of each layered ring structure is a flat, smooth surface which is free from any oil retaining grooves.

The circumferences of the adjacent thin metal rings of the layered ring structure are lubricated with a lubricating oil retained in the oil retaining grooves and hence those circumferences are not abraded easily. Since the inner circumference in contact with the saddle surfaces of the metal blocks of the innermost thin metal ring is formed in a flat, smooth surface of a low surface roughness, the inner circumference is not abraded easily. Since the inner circumference of the innermost thin metal ring is free from or is not provided with any oil retaining grooves, formation of parts respectively having different hardnesses and those having different internal stresses in the inner circumference of the innermost thin metal ring due to abrasion can be prevented and hence the abrasion of the inner circumference of the innermost thin metal ring can be suppressed. Consequently, the hardness and the residual stress of the surface layer of the inner circumference of the innermost thin metal ring can be maintained for a long period of time.

The abrasion of the circumferences of the thin metal rings is suppressed by the lubricating effect of the lubricating oil retained in the oil retaining grooves formed in the circumferences of the thin metal rings. The flat inner circumference in sliding contact with the saddle surfaces of the metal blocks of the innermost thin metal ring is not abraded easily. Thus the durability of the layered ring structure of the endless metal belt can be enhanced and thereby the durability of the endless metal band can be enhanced.

Preferably, the flat inner circumference of the innermost thin metal ring is finished in a surface roughness $R_{max}$ of 2.0 μm or below.

Since the inner circumference of the innermost thin metal ring is finished in such a small surface roughness, the progress of abrasion of the inner circumference can be highly effectively retarded, which further enhances the durability of the layered ring structure.

Preferably, the saddle surfaces of the metal block are finished in a surface roughness $R_{max}$ in the range of 2.0 to 4.0 μm Thus friction coefficient between the inner circumference of the innermost thin metal ring and the saddle surface of each metal block is smaller than that between the inner circumference provided with the intersecting grooves of the prior art endless metal band and the metal block. Thus allowable input torque can be increased, suppressing abrasion. Since both the inner circumference of the innermost thin metal ring and the saddle surfaces of the metal blocks are not provided with any grooves, bearing pressures acting on the inner circumference and the saddle surfaces are low and hence the inner circumference of the innermost thin metal ring is not abraded rapidly.

Thus, the abrasion of the inner circumference of the innermost thin metal ring can be further reduced, the durability of the layered ring structure is further enhanced, the friction coefficient between the inner circumference of the innermost thin metal ring and the saddle surfaces of the metal blocks is reduced and, consequently, allowable input torque can be increased, suppressing abrasion.

DETAILED DESCRIPTION OF THE INVENTION

An endless metal belt in a preferred embodiment of the present invention will be described with reference to FIGS. 1 to 9.

Figure 1:
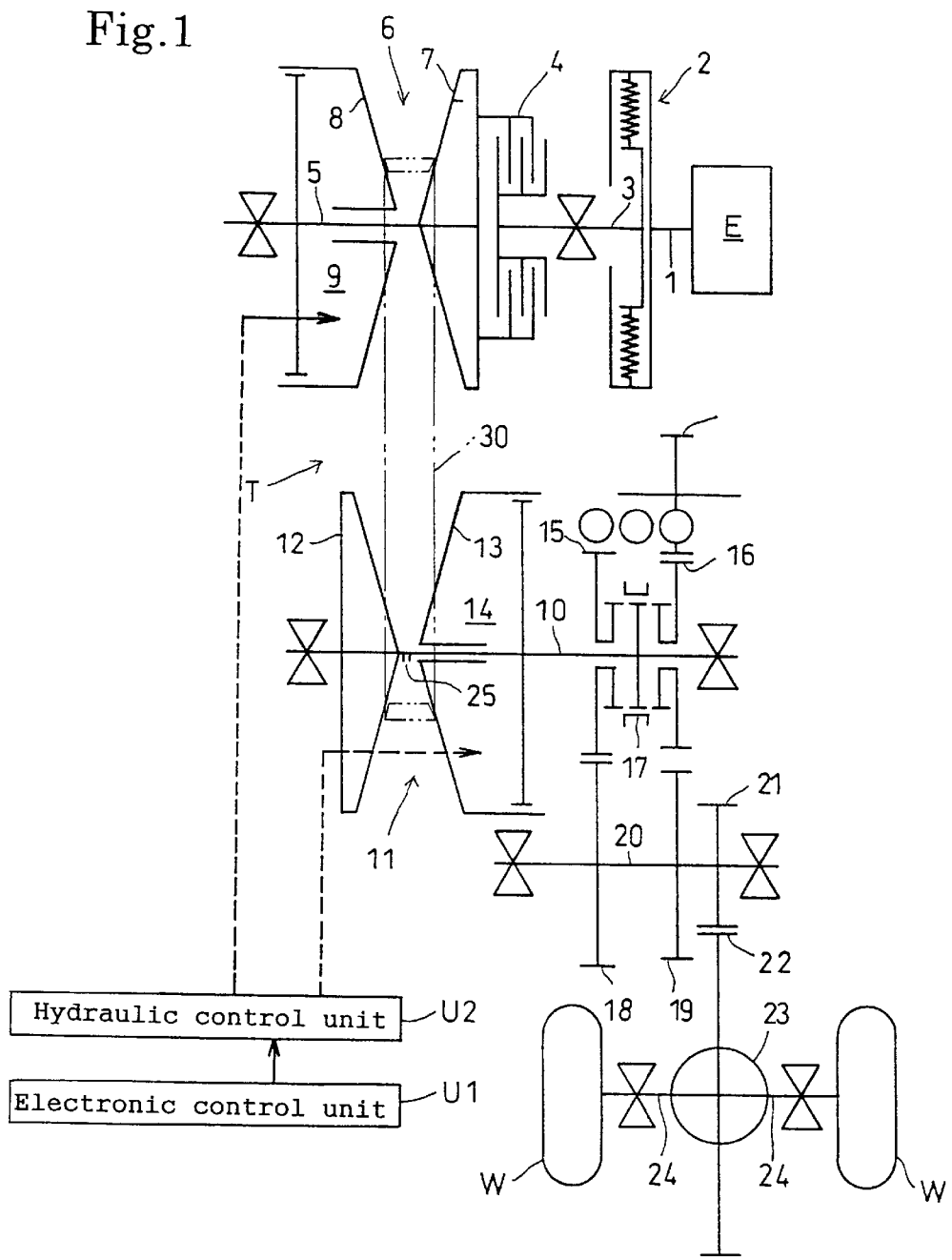
FIG. 1 is a diagrammatic view of a metal belt type continuously variable transmission provided with an endless metal belt in a preferred embodiment according of the present invention.

Referring to FIG. 1, a metal belt type continuously variable transmission T employing an endless metal belt 30 in a preferred embodiment of the present invention is disposed in an atmosphere of mist of a lubricating oil in a transmission case, not shown. An input shaft 3 is connected through a damper 2 to the crankshaft 1 of an internal combustion engine E. The input shaft 3 is connected through a starter clutch 4 to a drive shaft 5 included in the continuously variable transmission T. A drive pulley 6 mounted on the drive shaft 5 has a stationary part 7 formed integrally with the drive shaft 5 and a movable part 8 mounted on the drive shaft 5 so as to be movable toward and away from the stationary part 7. The movable part 8 is biased toward the fixed part 7 by fluid pressure applied to an oil chamber 9.

A driven shaft 10 is supported in parallel to the drive shaft 5 and a driven pulley 11 is mounted on the driven shaft 10. The driven pulley 11 has a stationary part 12 formed integrally with the driven shaft 10 and a movable part 13 mounted on the driven shaft 10 so as to be movable toward and away from the stationary part 12. The movable part 13 is biased toward the stationary part 12 by fluid pressure applied to an oil chamber 14. The oil chamber 9 of the movable part 8 and the oil chamber 14 of the movable part 13 are connected to a hydraulic control unit U2. The hydraulic control unit U2 is controlled by control signals provided by an electronic control unit U1.

The endless metal belt 30 is extended between the drive pulley 6 and the driven pulley 11. The driven shaft 10 is provided with an oil hole 25 to discharge a lubricating oil toward the endless metal belt 30.

A forward drive gear 15 and a reverse drive gear 16 are mounted on the driven shaft 10 so as to be rotatable relative to each other. The forward drive gear 15 and the reverse drive gear 16 are engaged with and disengaged from the driven shaft 10 selectively by a selector 17. An output shaft 20 formed integrally with a forward driven gear 18 and a reverse driven gear 19 respectively engaging the forward drive gear 15 and the reverse drive gear 16 is driven for forward rotation and reverse rotation through the gears 15, 16, 18 and 19. The driving force of the output shaft 20 is transmitted differentially through a drive gear 21, a driven gear 22, a differential gear 23 and right and left axles 26 to right and left wheels W.

Figure 2:
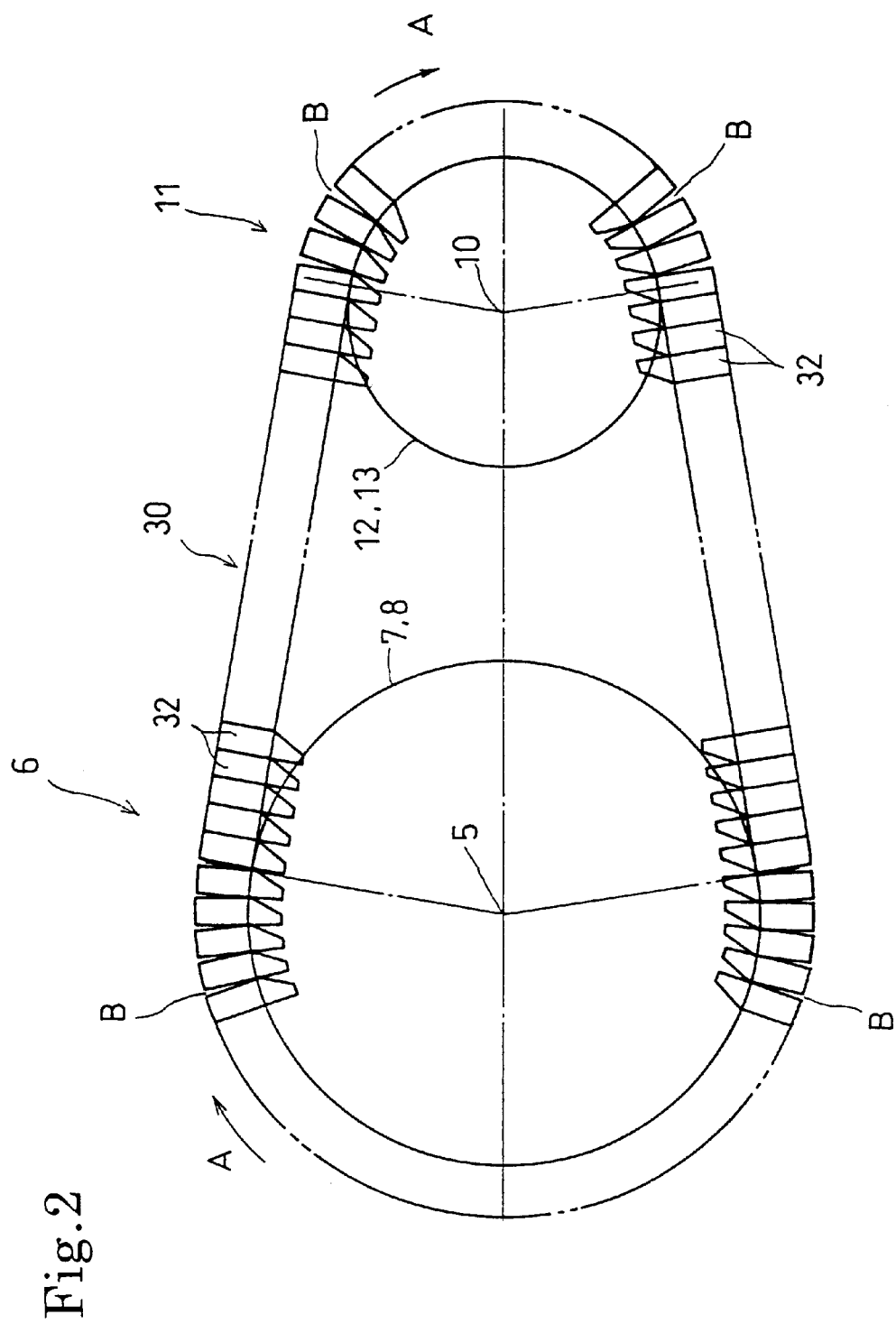
FIG. 2 is a schematic side elevation of the endless metal belt shown in FIG. 1 extending between a pair of pulleys.
Figure 3:
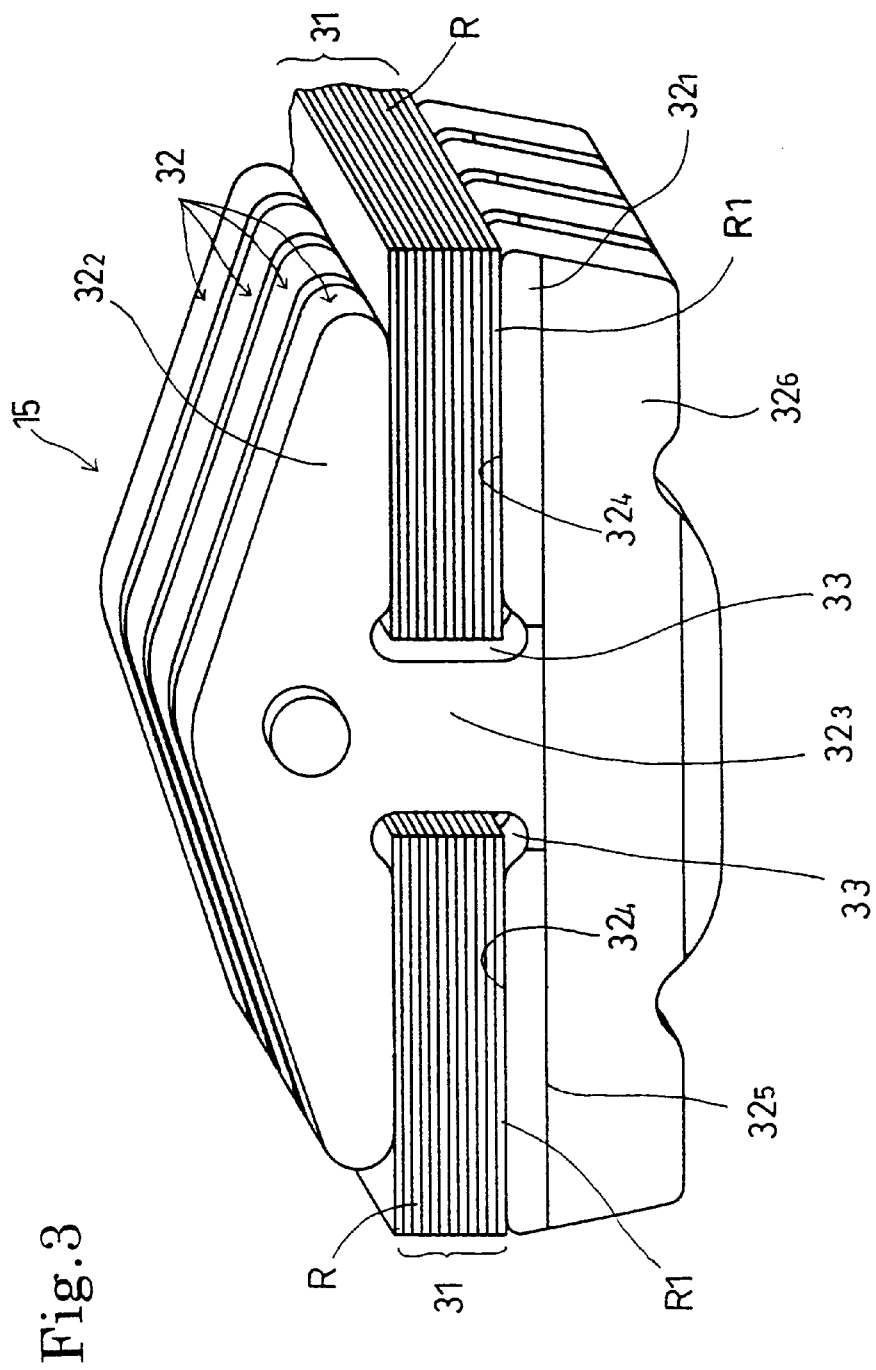
FIG. 3 is a fragmentary perspective view of the endless metal belt shown in FIG. 1.
Figure 4:
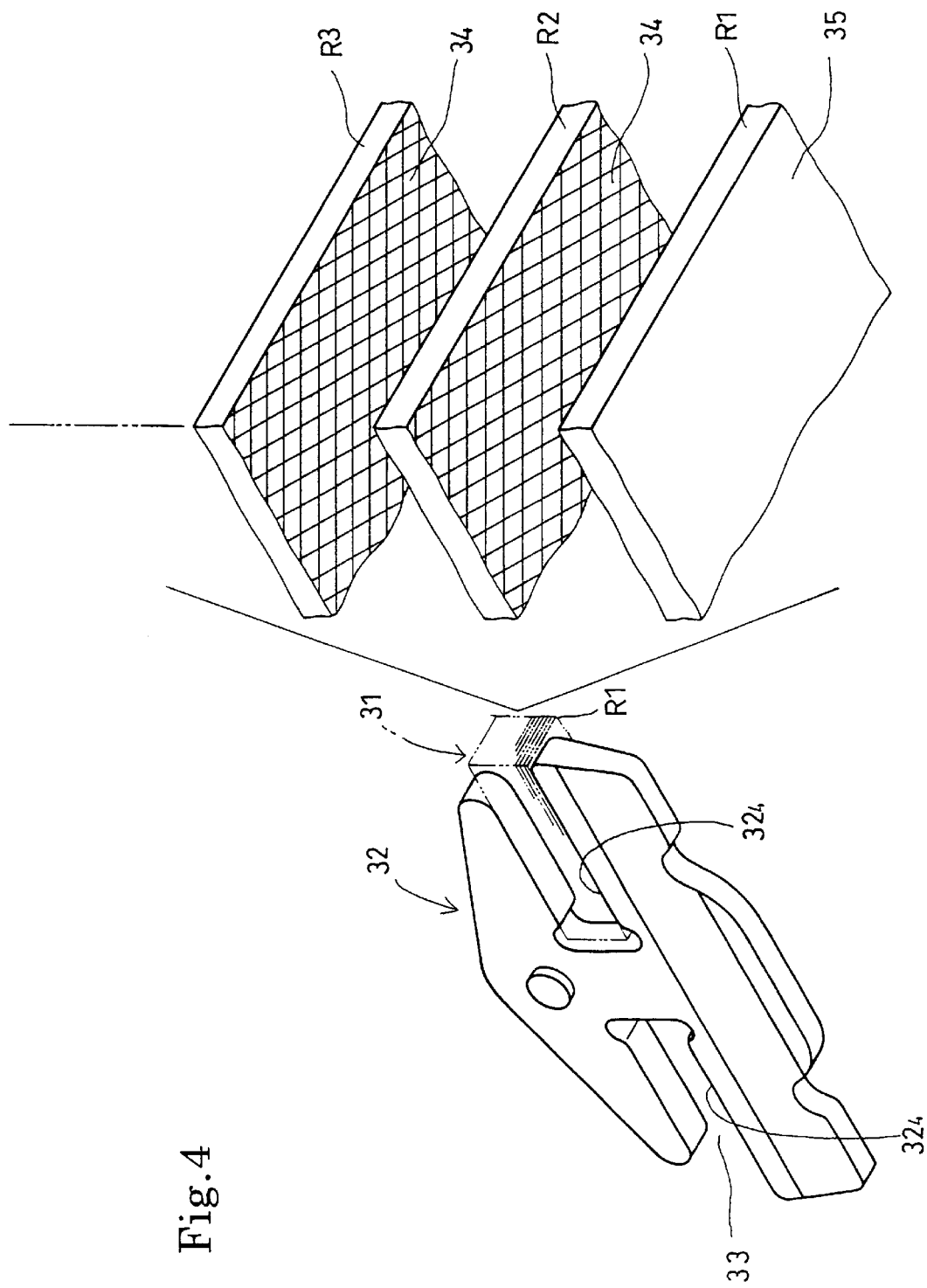
FIG. 4 is a fragmentary, exploded perspective view of the endless metal belt shown in FIG. 3.
Figure 5:
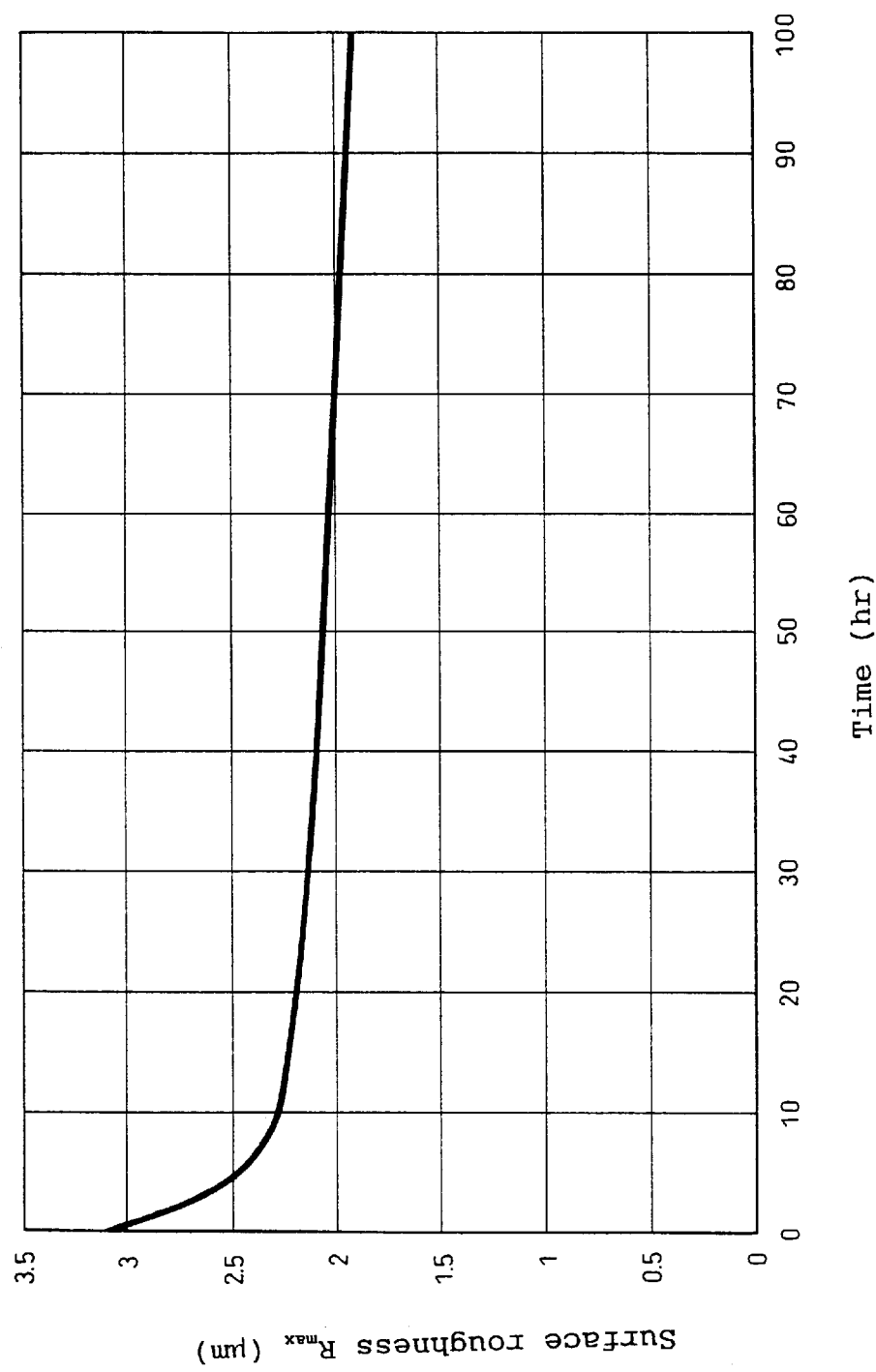
FIG. 5 is a graph showing variation of the surface roughness of a circumference of a thin metal ring with time.
Figure 6:
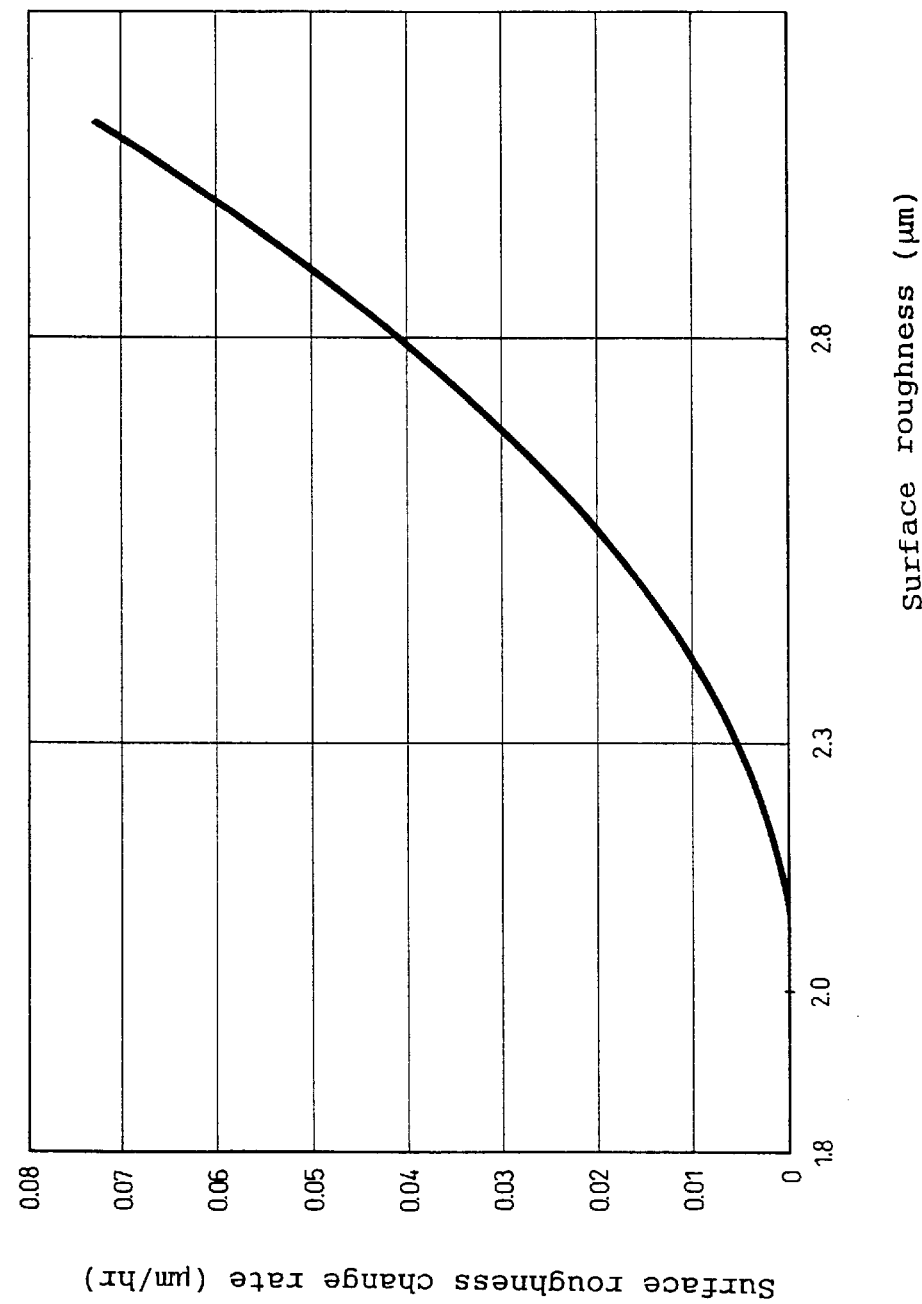
FIG. 6 is a graph showing the relation between surface roughness change rate and the surface roughness of a circumference of a thin metal ring.

Referring to FIGS. 2 to 4, the endless metal belt 30 comprises a pair of layered ring structures 31 and a plurality of metal blocks 32 successively arranged along the length of the layered ring structures 31 on the layered ring structures 31 so as to slidable relative to the layered ring structures 31. Each layered ring structure 31 is formed by closely superposing a plurality of thin metal rings R (R1, R2, . . . n and Rn) (twelve thin metal rings in this embodiment) so as to be slidable relative to each other. The thin metal rings R in this embodiment is made of a steel. The metal blocks 32 in this embodiment are made of a steel.

Each metal block 32 has a body $32_1$, a hooking part $32_2$ and a neck part $32_3$ extending between the body $32_1$ and the hooking part $32_2$. A pair of slots 33 extend on the opposite sides of the neck part $32_3$, respectively, and between the body $33_1$ and the hooking part $32_2$. The layered ring structures 31 are inserted in the slots 33 of the metal blocks 32 to support the metal blocks 32 thereon so as to be slidable relative to the layered ring structures 31. One of opposite surfaces defining each slot 33, in sliding contact with the inner circumference of the innermost thin metal ring R1 is a saddle surface $32_4$. The body $32_1$ of each metal block 32 is provided in its front surface with respect to a moving direction A with a rocking edge $32_5$ and an inclined surface $32_6$ inclined in the radial direction of the endless metal belt 30 so as to recede with respect to the moving direction A. The metal blocks 32 turn relative to the adjacent ones on the rocking edges $32_5$ to enable the endless metal belt 30 to be wound round the pulleys 6 and 11.

In wrapping parts of the endless metal belt 30 wrapping round the drive pulley 6 and the driven pulley 11, gaps B are formed between parts of the adjacent metal blocks 32 on the outer side of the rocking edges $32_5$ as the metal blocks 32 are tiltable because the metal blocks 32 have the inclined surfaces $32_6$, respectively.

In a first straight part of the endless metal belt 30 moving in the moving direction A from the drive pulley 6 toward the driven pulley 11, the outer part of the succeeding metal block 32 with respect to the moving direction A on the radially outer side of the rocking edge $32_5$ of the same is pressed closely against the preceding metal block 32 by a pressure acting on the succeeding one of the adjacent metal blocks 32 toward the preceding one of the same. In a second straight part of the endless metal belt 30 moving from the driven pulley 11 toward the drive pulley 6, a slight gap is formed between adjacent metal blocks 32.

In this embodiment, the thin metal rings R is about 660 mm in circumference, about 9.2 mm in width and about 0.18 mm in thickness. All the thin metal rings R2, R3, . . . and Rn excluding the innermost thin metal ring R1 have inner circumferences provided with meshy grooves 34 as shown in FIG. 4. The grooves 34 are formed by rolling or the like. The depth of the grooves 34 (height of ridges between the grooves 34) is in the range of 2.5 to 5.0 $\mu$m and the width of the ridges is, for example, 0.1 mm.

While the nonstep variable-speed transmission T is in operation, the outer circumference of the inner one of the adjacent thin metal rings $R_N$ and $R_{N+1}$ (N=1 to 11), i.e., the inner thin metal ring $R_N$, and the inner circumference of the outer one of the adjacent thin metal rings $R_N$ and $R_{N+1}$, i.e., the thin metal ring $R_{N+1}$, are in sliding contact with each other.

Mist of the lubricating oil diffused in the transmission case accommodating the continuously variable transmission T are retained in the grooves 34. The sliding surfaces of adjacent thin metal rings $R_N$ and $R_{N+1}$ are lubricated by the lubricating oil retained in the grooves 34, so that the abrasion of the adjacent thin metal rings $R_N$ and $R_{N+1}$ can be suppressed.

Differing from the inner circumferences of thin metal rings R2, R3, . . . and Rn, the inner circumference of the innermost thin metal ring R1 is not provided with the meshy grooves 34. The inner circumference of the innermost thin metal ring R1 is finished by rolling or the like in a flat, smooth surface 35 having a surface roughness $R_{max}$ of 2.0 $\mu$m or below, preferably, in the range of 1.0 to 1.6 $\mu$m. The saddle surfaces $32_4$ of the metal blocks 32 are not provided with any oil retaining grooves. The saddle surfaces $32_4$ are finished by shearing or the like in surfaces having a surface roughness $R_{max}$ in the range of 2.0 to 4.0 $\mu$m.

Figure 7:
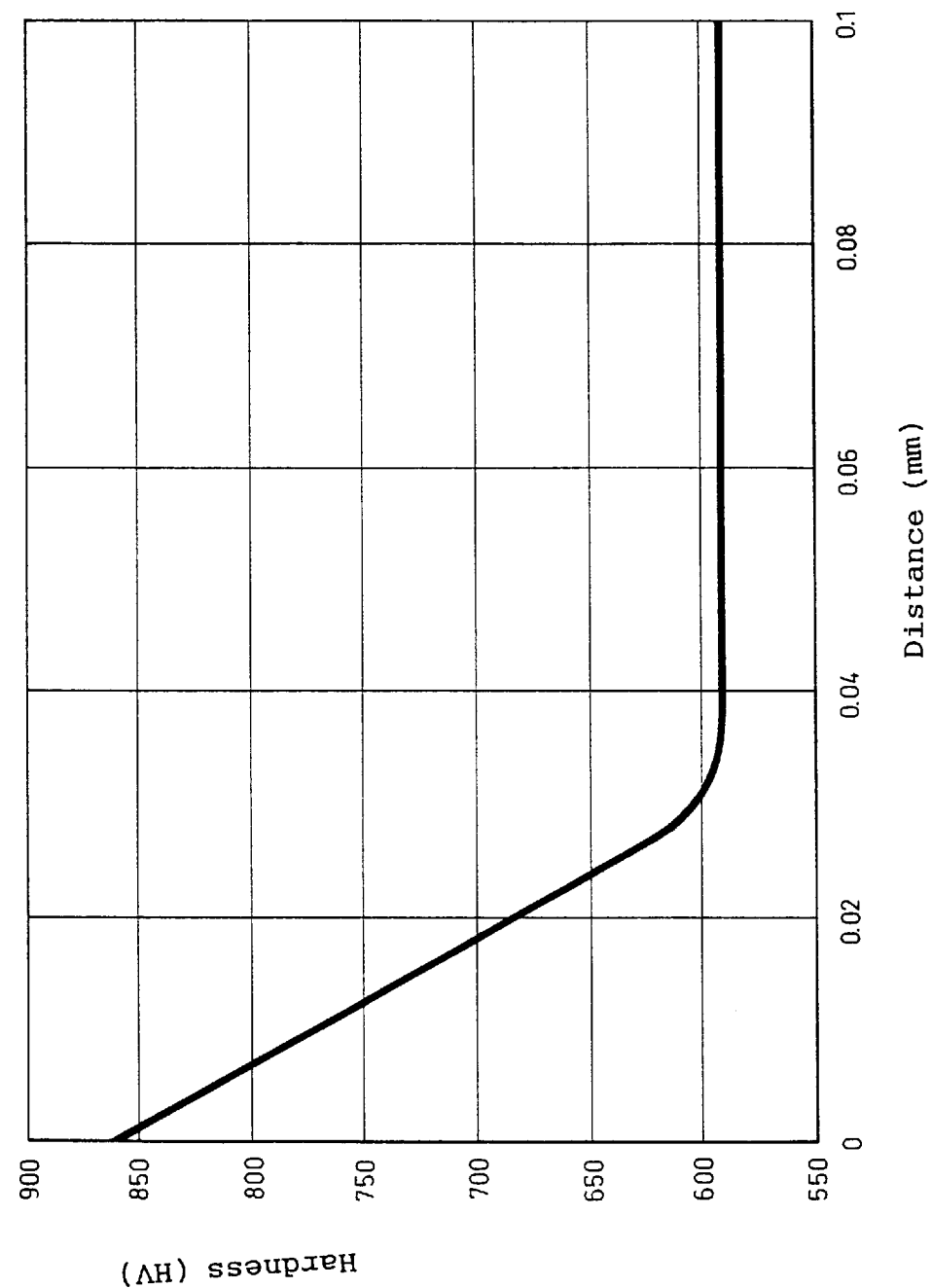
FIG. 7 a graph showing variation of the hardness of an endless metal band with distance from the inner circumference of the endless metal band in which a hard skin is formed.
Figure 8:
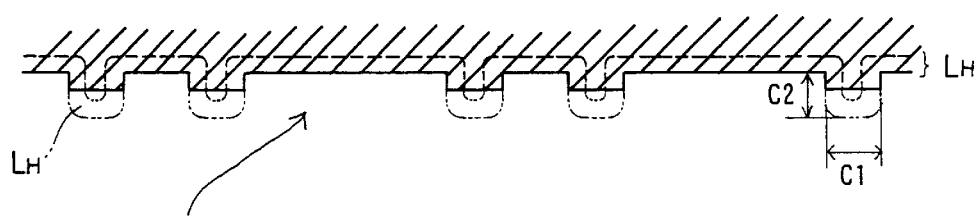
FIG. 8 is a sectional view explaining the condition of a hard skin formed in an endless metal band when a surface layer provided with intersecting grooves is abraded.
Figure 9:
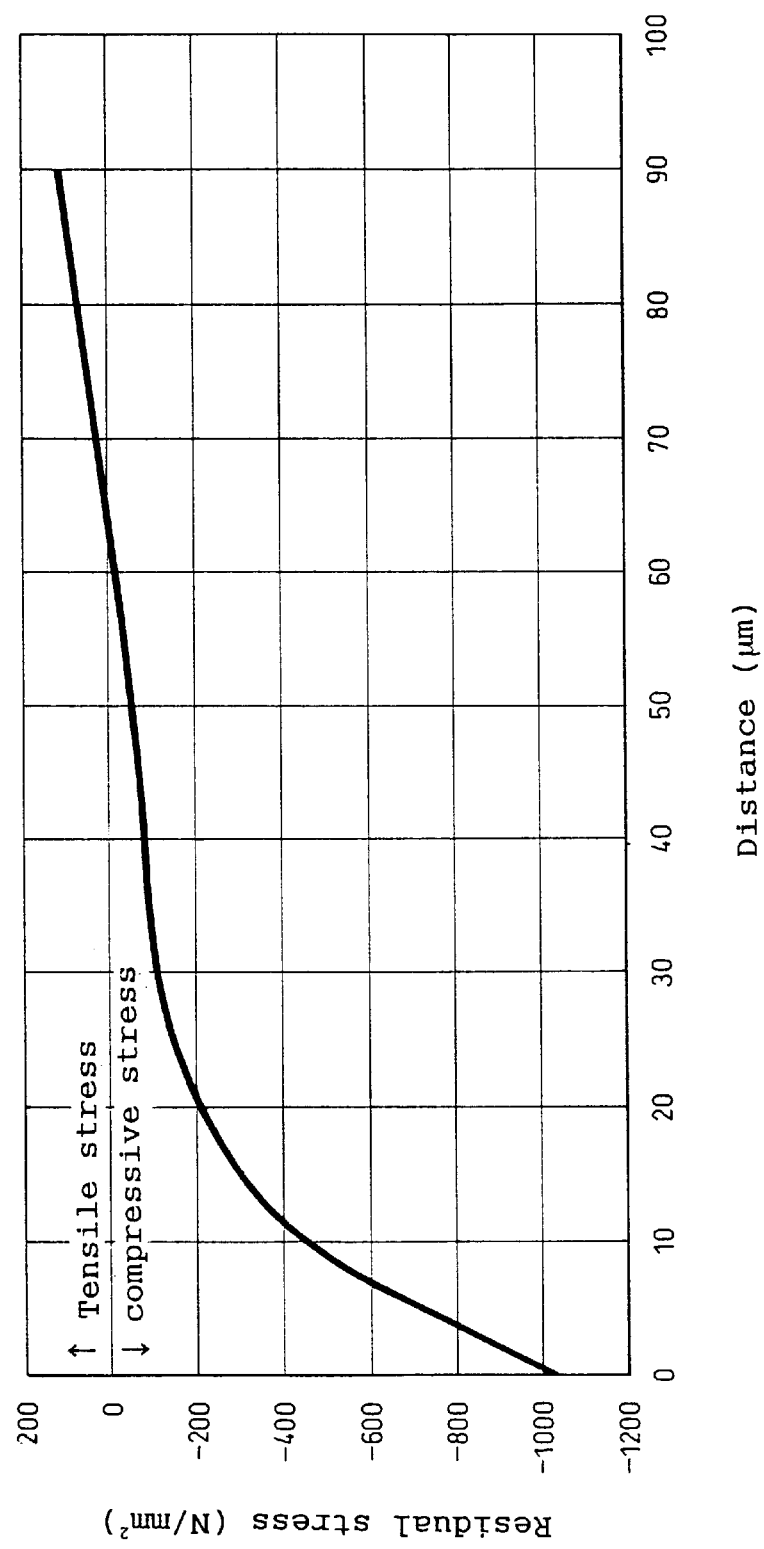
FIG. 9 is a graph showing variation of residual stress with distance from a circumference in which an internally stressed layer is formed of an endless metal band.

The innermost thin metal ring R1, and the other thin metal rings R2, R3, . . . and Rn having the inner circumferences provided with the grooves 34 are subjected to a heat treatment process or a surface hardening process, such as a nitriding process, to form a hard skin $L_H$ having a property similar to that represented by the graph shown in FIG. 7 and an internally stressed layer having a property similar to that represented by the graph shown in FIG. 9 in their surface. The hardness of the inner and the outer circumferences of the thin metal rings R2, R3, . . . and Rn is on the order of 850 HV.

The lubricating oil is supplied through the oil hole 25 of the driven shaft 10 to a part of the endless metal belt 30 wound round the driven pulley 11. The lubricating oil drips through the slight gaps between the adjacent metal blocks 32 onto the inner circumference of the innermost thin metal ring R1 and the saddle surfaces $32_4$. Thus the flat, smooth surface 35, i.e., the inner circumference of the innermost thin metal ring R1, is lubricated satisfactorily and hence the abrasion of the inner circumference of the innermost thin metal ring R1 and the saddle surfaces $32_4$ of the metal blocks 32 is suppressed.

In parts of the endless metal belt 30 wound round the drive pulley 6 and the driven pulley 11, the gaps B are formed between the radially outer parts of the adjacent metal blocks 32 on the radially outer side of the rocking edges $32_5$. The mist of the lubricating oil diffused in the transmission case diffuses into the gaps B to lubricate the inner circumference of the innermost thin metal ring R1 and the saddle surfaces $32_4$ of the metal blocks.

In the first straight part of the endless metal belt 30, adjacent metal blocks 32 are pressed together and the gap B are closed. When the metal blocks 32 engage the drive pulley 6, the lubricating oil diffused into the gaps B are forced out of the gaps B and lubricates the inner circumference of the innermost thin metal ring R1 and the saddle surfaces $32_4$ of the metal blocks 32. In the second straight part, the slight gaps are formed between the adjacent metal blocks 32 and hence the mist of the lubricating oil diffuses into those slight gaps to lubricate the inner circumference of the innermost thin metal ring R1 and the saddle surfaces $32_4$ of the metal blocks 32.

The endless metal belt 30 was incorporated into the continuously variable transmission and was subjected to high-speed endurance tests, in which input torque was 161.8 Nm, engine speed was 6000 rpm and speed change ratio was 0.61. Friction coefficient between the innermost thin metal ring R1 and the metal blocks 32 was measured. The friction coefficient between the innermost thin metal ring R1 and the metal blocks 32 was smaller than that between an innermost thin metal ring provided with the grooves 34 in its inner circumference and the metal block 32 by about 13% and the allowable input torque capacity of the endless metal belt 30 could be increased by about 20%.

The operation and effect of the endless metal belt 30 will be described hereafter. When the internal combustion engine E is in operation to drive the crankshaft 1 and the drive pulley 6 for rotation, torque is transmitted by the endless metal belt 30 from the drive pulley 6 to the driven pulley 11 by pressure applied to the metal blocks 32. The electronic control unit U1 provides control signals to make the hydraulic control unit U2 control the pressures in the oil chambers 9 and 14. Thus the respective widths of the pulley grooves of the drive pulley 6 and the driven pulley 11 are varied to vary the effective diameters of the drive pulley 6 and the driven pulley 11 continuously for the continuously variation of the speed change ratio of the continuously variable transmission T.

While the continuously variable transmission T is in operation, the outer circumference of the thin metal ring $R_N$ and the inner circumference of the thin metal ring $R_{N++1}$ slide relative to each other, and the inner circumference of the innermost thin metal ring R1 slides relative to the saddle surfaces $32_4$ of the metal blocks 32. Since the inner circumference of the thin metal ring $R_{N+1}$ is provided with the oil retaining groove 34 and the lubricating oil is retained therein, the outer circumference of the thin metal ring $R_N$ and the inner circumference of the thin metal ring $R_{N++1}$ in sliding contact with each other are lubricated with the lubricating oil retained in the oil retaining grooves 34 and the abrasion of the same is suppressed.

Since the inner circumference of the innermost thin metal ring R1 in sliding contact with the saddle surfaces $32_4$ of the metal blocks 32 is finished in the flat, smooth surface 35 having the surface roughness $R_{max}$ of 2.0 μm or below, the abrasion of the same inner circumference is suppressed. Since the inner circumference of the innermost thin metal ring R1 is not provided with the grooves 34, formation of parts respectively having different hardnesses and those having different internal stresses in the inner circumference of the innermost thin metal ring R1 having the property shown in FIG. 8 due to abrasion can be prevented and hence the abrasion of the inner circumference of the innermost thin metal ring R1 can be suppressed. Consequently, the hardness and the residual stress of the surface layer of the inner circumference of the innermost thin metal ring R1 can be maintained for a long period of time.

Thus, the abrasion of the circumferences of the adjacent thin metal rings $R_N$ and $R_{N+1}$ in sliding contact with each other can be suppressed by the lubricating oil retained in the grooves 34 formed in the inner circumference of the outer thin metal ring $R_{N+1}$ of the adjacent thin metal rings $R_N$ and $R_{N+1}$, and the inner circumference of the innermost thin metal ring R1 formed in the flat, smooth surface 35 and in sliding contact with the saddle surfaces $32_4$ can be suppressed. Consequently, the layered ring structures 31 of the endless metal belt 30 has improved durability and hence the endless metal belt 30 has improved durability.

The lubricating oil is supplied through the oil hole 25 of the driven shaft 10 to a part of the endless metal belt 30 wound round the driven pulley 11, the lubricating oil drips through the slight gaps between adjacent metal blocks 32 onto the inner circumference of the innermost thin metal ring R1 and the saddle surfaces $32_4$. Thus the flat, smooth surface 35, i.e., the inner circumference of the innermost thin metal ring R1, is lubricated satisfactorily and hence the abrasion of the inner circumference of the innermost thin metal ring R1 and the saddle surfaces $32_4$ of the metal blocks 32 is suppressed.

Since the inner circumference of the innermost thin metal ring R1, i.e., the flat, smooth surface 35, has a small surface roughness $R_{max}$ of 2.0 μm or below, the rate of abrasion of the same inner circumference can be greatly reduced and, consequently, the durability of the layered ring structure 31 can be further improved.

The inner circumference of the innermost thin metal ring R1 has the surface roughness $R_{max}$ of 2.0 μm or below, the saddle surfaces $32_4$ of the metal blocks 32 has the surface roughness $R_{max}$ in the range of 2.0 to 4.0 μm and the friction coefficient between the inner circumference of the innermost thin metal ring R1 and the saddle surfaces $32_4$ of the metal blocks 32 is smaller than that between the inner circumference provided with the grooves 34 of the innermost endless metal band and the saddle surfaces of the metal blocks of the prior art endless metal belt. Therefore, abrasion can be suppressed and allowable input torque can be increased. Since any grooves are not formed in the inner circumference of the innermost thin metal ring R1 and the saddle surfaces $32_4$ of the metal blocks 32, bearing pressures acting on the inner circumference of the innermost thin metal ring R1 and the saddle surfaces $32_4$ of the metal block 32 are low and hence the inner circumference of the innermost thin metal ring R1 is not abraded rapidly.

Thus, the abrasion of the inner circumference of the innermost thin metal ring R1 can be further reduced, the durability of the layered ring structure 31 is further enhanced, the friction coefficient between the inner circumference of the innermost thin metal ring R1 and the saddle surfaces $32_4$ of the metal blocks 32 is reduced and, consequently, allowable input torque can be increased.

The grooves 34 may be formed in the outer circumferences of the thin metal rings R2, R3, . . . and Rn instead of in the inner circumferences of the same. When the grooves 34 are formed in the outer circumferences of the thin metal rings R2, R3, . . . and Rn, the groove 34 is formed also in the outer circumference of the innermost thin metal ring R1. The grooves 34 does not need to be formed in a meshy arrangement but may be formed in any proper arrangement suitable for retaining the lubricating oil for the reduction of the abrasion of the thin metal rings R.

What is claimed is:

1. An endless metal belt to be trained around a pair of pulleys to transmit torque from one of the pulleys to the other, said endless metal belt comprising:

a pair of layered ring structures each formed by superposing a plurality of metal rings in layers so as to be slidable relative to each other; and a plurality of metal blocks arranged along the length of the pair of layered ring structures and supported on the pair of layered ring structures so as to be slidable relative to the pair of layered ring structures;

wherein at least one of said metal rings is provided with oil retaining grooves upon an inner circumferential surface thereof, and an inner circumferential surface of an innermost metal ring in sliding contact with a saddle surface of said metal blocks is a flat, smooth surface which is free from any oil retaining grooves, and wherein said saddle surface has a surface roughness not smaller than a surface roughness of said flat, smooth surface of the innermost metal ring.

2. The endless metal belt according to claim 1, wherein the surface roughness of said flat, smooth surface of the innermost metal ring is from 1.0 to 1.6 μm.

3. The endless metal belt according to claim 1, wherein the surface roughness of said flat, smooth surface of the innermost metal ring is a maximum value of 2.0 μm.

4. The endless metal belt according to claim 3, wherein the surface roughness of said saddle surface is in a range of 2.0 to 4.0 μm.

5. An endless metal belt to be trained around a pair of pulleys to transmit torque from one pulley to the other, said endless metal belt comprising:

a pair of layered ring structures each formed by superposing a plurality of metal rings in layers so as to be slidable relative to each other; and a plurality of metal blocks arranged along the length of the pair of layered ring structures and supported on the pair of layered ring structures so as to be slidable relative to the pair of layered ring structures;

wherein at least one of said metal rings is provided with oil retaining grooves upon an inner circumferential surface thereof, and an inner circumferential surface of an innermost metal ring in sliding contact with a saddle surface of said metal blocks is a flat, smooth surface which is free from any oil retaining grooves, and wherein said flat, smooth surface of the innermost metal ring has a surface roughness at a maximum value of 2.0 μm.

6. The endless metal belt according to claim 5, wherein the surface roughness of said flat, smooth surface of the innermost metal ring is from 1.0 to 1.6 μm.

7. The endless metal belt according to claim 5, wherein the surface roughness of said saddle surface is in a range of 2.0 to 4.0 μm.

* * * * *